United States Patent [19]

Jones et al.

[11] 4,225,531

[45] Sep. 30, 1980

[54] FLUIDIZATION PROMOTERS

[75] Inventors: David H. Jones, Needham, Mass.; Terry Shingles, Sasolburg, South Africa; Felix T. Kelly, Sasolburg, South Africa; Mark E. Dry, Sasolburg, South Africa

[73] Assignee: The Badger Company, Inc., Cambridge, Mass.

[21] Appl. No.: 779,237

[22] Filed: Mar. 18, 1977

[51] Int. Cl.$^3$ .............. C07C 27/06; B01J 21/18; C07C 27/06; C10B 47/24

[52] U.S. Cl. ............ 260/449.6 R; 260/449 R; 252/447; 201/31; 252/410; 252/443; 252/444; 252/461; 366/101; 366/604; 252/472; 423/DIG. 16

[58] Field of Search .............. 259/DIG. 17; 423/DIG. 16; 201/31; 252/410, 443, 444, 447, 461, 472; 260/449.6 R; 366/101, 604

[56] References Cited

U.S. PATENT DOCUMENTS

| | | | |
|---|---|---|---|
| 2,287,891 | 6/1942 | Linckh | 252/443 |
| 2,360,787 | 10/1944 | Murphree et al. | 260/449.6 |
| 2,393,636 | 1/1946 | Johnson | 208/73 |
| 2,459,444 | 1/1949 | Main | 260/449.6 |
| 2,468,521 | 4/1949 | Sweetser et al. | 260/449.6 |
| 2,471,913 | 5/1949 | Sumerford | 260/449.6 |
| 2,483,485 | 10/1949 | Barr | 208/149 |
| 2,503,291 | 4/1950 | Odell | 23/288 S |
| 2,553,398 | 5/1951 | Atwell | 260/449.6 |
| 2,581,135 | 1/1952 | Odell | 23/288 S |
| 2,602,019 | 7/1952 | Odell | 23/288 S |
| 2,620,313 | 12/1952 | Odell | 23/288 S |
| 2,626,275 | 1/1953 | Sullivan | 260/449.6 |
| 2,627,499 | 2/1953 | Krebs | 201/31 |
| 2,631,921 | 3/1953 | Odell | 23/288 S |
| 2,665,288 | 1/1954 | Odell | 260/449.6 |
| 3,184,515 | 5/1965 | Penner et al. | 260/658 R |
| 3,296,319 | 1/1967 | Bohl et al. | 260/659 A |
| 3,502,737 | 3/1970 | Ghublikian | 260/669 R |
| 3,712,800 | 1/1973 | Schutte | 208/127 X |
| 3,726,791 | 4/1973 | Kimberlin, Jr. et al. | 208/127 |
| 3,876,526 | 4/1975 | Mulaskey et al. | 208/127 X |
| 3,954,599 | 5/1976 | Ooka | 208/127 X |

FOREIGN PATENT DOCUMENTS 654667 6/1951 United Kingdom .

OTHER PUBLICATIONS

In Re Edwards (No. 6147) Decided Apr. 18, 1956.
C. L. Martell, Industrial Carbon, 2nd Ed. 1946, D. Von Nostrand Co. Inc., N. Y.
Fluidization and Fluid-Particle Systems, Zenz-Othmer Reinhold Chem. Eng. Ler., Reinhold Pub. Co., N.Y., 1960.
Fluidization, D. F. Othmer Reinhold Pub. Co., N.Y., 1956.
Fluidization and Fluid-Particle Systems, Zenz-Othmer, C. R. Wilke Consulting Ed., Reinhold Pub. Co., N.Y., p. 113, 1960.

*Primary Examiner*—Delbert E. Gantz
*Assistant Examiner*—William G. Wright
*Attorney, Agent, or Firm*—Schiller & Pandiscio

[57] ABSTRACT

The invention is directed to improving the quality of fluidization of fluidized solids and comprises the addition of fluidization promoters in particle form that have a smaller density and particle size than the neat solids. In a preferred embodiment of the invention the catalyst is a Fischer-Tropsch catalyst and the fluidization promoter comprises carbon particles.

24 Claims, 3 Drawing Figures

STANDARD CATALYST — NO PROMOTER

25% VOL. DOLOMITE

25% VOL. CARBON

25% VOL. ALUMINA

25% VOL. SILICA

CATALYST ONLY

5% VOL. CARBON

15% VOL. CARBON

25% VOL. CARBON

FLUIDIZATION PROMOTERS

This invention relates to a method for improving the quality of fluidization in a fixed fluidized bed system when the particulate material comprising the bed possesses poor fluidizing properties. It relates particularly to the addition of a promoter to improve the fluidization of a catalyst in a chemical reaction system where the chemical reaction is carried out in a bed containing a catalyst that is fluidized by a gas which may or may not be a reactant.

As is well known, the conversion efficiency and yield of catalytic chemical reactions carried out in a fixed fluidized bed reactor depends to a great extent on the quality of catalyst fluidization. For example, iron group, and especially heavy iron and/or iron oxide-based Fischer-Tropsch catalysts, are difficult to fluidize. Poor fluidization of catalyst particles leads to formation of large bubbles of reacting gas and consequent by-passing of reactants through the bed. This leads to low conversion.

Various approaches have been suggested in the past for improving the fluidization in a fixed fluidized bed (as used herein, the term "fixed fluidized bed" denotes a bed fixed in space, as opposed to beds which move through space as in transport, riser or so-called fast-fluid bed reactors). One approach is to construct baffles inside a reactor in an attempt to disperse large bubbles of reacting gas and thereby avoid significant gas by-passing through the bed. This approach does not always improve conversion and instead it may create local hot-spots and excessive carry over of catalyst particles due to large bubbles bursting at the surface.

Another approach is the addition of a fluidization promoter to the fixed fluidized bed system. The promoter is a particulate substance that is inert to the reaction system to which it is added. However, addition of certain materials recommended in the past as promoters for the iron Fischer-Tropsch catalyst has the effect of deactivating the catalyst and specifically, reducing the oil production and selectivity. Also, promoters suggested in the past, specifically those related to the iron Fischer-Tropsch catalyst, have been coarser than the neat catalyst. U.S. Pat. No. 2,459,444 issued Jan. 18, 1949 to T. C. Main for Hydrocarbon Synthesis teaches that good fluidization of an iron based Fischer-Tropsch catalyst can be maintained by the addition of a relatively coarse particulate material, as the Fischer-Tropsch catalyst tends to degrade and become finer with time. Main further teaches that the added particulate material should have a density which is less than that of the catalyst in order to facilitate good mixing between the light, coarse promoter and the heavy, fine catalyst, and specifies that the added particulate material may be silica gel, dolomite, sand or alumina. According to Main, the addition of the coarser promoter helps maintain a desirable particle size distribution. The method disclosed in the Main patent requires relatively large amounts (at least 20 wt. %) of coarse fluidization promoter in order to provide sufficient effective particles, which results in a relatively large volume of the reactor consisting of an inert component. It is thus apparent that the economics of any fluidization process improves as the quantity of promoter is decreased for any given quality of fluidization. Japanese Pat. No. 27,263 teaches that generally good fluidization in fixed fluidized bed reactor systems can be achieved by the addition of 5-20% by mass of a promoter, but that less than 5% by mass is not effective. U.S. Pat. No. 2,471,913, issued May 31, 1949 to S. D. Sumerford, discloses the addition of a diluent in the form of acid-treated sand to a bed of an iron catalyst in a hydrocarbon synthesis process to improve heat transfer and incidently to maintain catalyst fluidity.

A major disadvantage of the approaches taught by the prior art is that additives such as silica gel, sand, or alumina are not inert to the Fischer-Tropsch synthesis reactions. Thus, addition of these materials tends to deactivate the alkali-promoted iron catalysts and also reduces the oil production and selectivity, giving results comparable to those obtained with iron catalyst containing no alkali promoters. It would thus appear that these additives tend to nullify the chemical promotional properties of the alkali and in this way deactivate it, especially in regard to oil production. Use of acid-treated sand as taught by Somerford may not result in as substantial a loss or nullification of Fischer-Tropsch catalyst activity and selectivity as occurs with untreated sand. However, addition of untreated or acid-treated sand does not improve the quality of fluidization of the catalyst but merely maintains the quality that can be obtained without the presence of a fluidization promoter. Since the fluidizing properties of Fischer-Tropsch catalyst are inherently poor, providing an additive that merely maintains the quality of fluidization is obviously inadequate.

Although it has been observed that adding a foreign particulate material to a bed of solid may be helpful in maintaining a given quality of fluidization, as far as Applicants are aware none of the methods which form part of the prior art has provided a clear and satisfactory solution to the problem of how to obtain and maintain good fluidization of a bed of a difficult to fluidize material, e.g., a heavy particulate catalyst such as a Fischer-Tropsch iron catalyst. In this context good fluidization is defined qualitatively by a high degree of solids mixing, by a low degree of gas by-passing through the bed, and by the stability of bubble behavior and rate of growth, i.e., lack of slugging. It appears that the failure of the prior art to solve the problem of how to consistently achieve and maintain good fluidization of a heavy particulate catalyst is due to the fact that the prior art has added a foreign material fluidization promoter primarily for the purpose of adjusting the size distribution of the total bed, in the belief that the latter is important to achieve good fluidization. However, we have discovered that it is the specific properties of the added promoter relative to the neat catalyst and not merely the size distribution of the catalyst-promoter mixture that is required to be controlled in order to maximally improve the quality of fluidization. This holds true for fluidized beds of non-catalytic as well as catalytic particles.

Accordingly, it is an object of this invention to provide a method of improving the quality of fluidization of fixed beds of particulate matter, rather than merely maintaining a given quality of fluidization as is taught in the prior art.

Still another object is to provide a method and means for improving fluid bed catalytic reactions conducted on a commercial scale.

Another object is to provide promoters for improving the fluidization of a bed of particulate matter and especially to provide materials which can be effectively added to heavy particulate catalysts to substantially improve the fluidizing properties of the latter.

Still another object is to provide a method and materials for improving the quality of fluidization and thereby the conversion efficiency of a fluid bed catalytic chemical reaction process.

A more specific object is to provide a method of improving the fluidization of a bed of particulate material by addition of a fluidization promoter whereby the optimum quantity of promoter is a function of the properties of the promoter relative to the properties of the particulate material.

A still more specific object is to provide a fluidization promoter for a relatively heavy, difficult-to-fluidize catalyst for hydrocarbon synthesis reactors where the catalyst is disposed in a fixed fluidized bed.

Still a further object is to provide a method of improving the fluidization characteristic of an iron group Fischer-Tropsch catalyst, and particularly a predominately iron-containing catalyst such as an alkali-promoted iron oxide catalyst in a fixed fluidized bed, without reducing the activity of the catalyst and without reducing the oil production and selectivity.

Other objects and the features and advantages of this invention are set forth in or made obvious by the following detailed description and the accompanying drawings in which.

Figure 1:
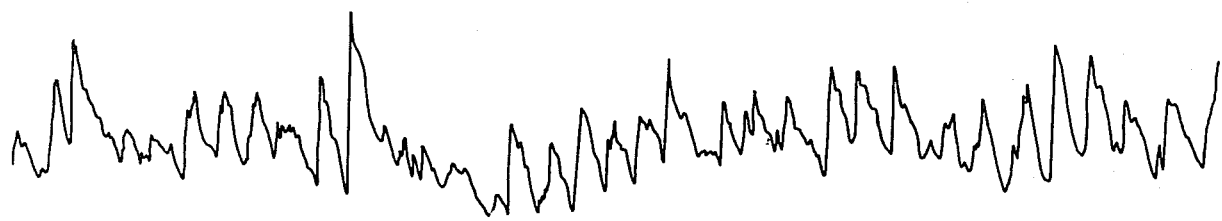
FIG. 1 is a series of waveforms of pressure fluctuations across a fluidized bed and shows how different promoters have different fluidizing properties.
Figure 1:
Figure 1:
Figure 1:
Figure 1:
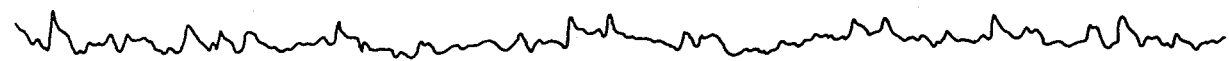

Summarized briefly, the invention comprises adding selected quantities of a selected inert fluidization promoter in a finely divided form to a bed of a relatively heavy particulate material to substantially improve the fluidizing properties of the latter, as opposed to merely maintaining the quality of fluidization as taught in the prior art. In a preferred embodiment of the invention, the catalyst bed comprises an iron group or iron based Fischer-Tropsch catalyst, and the fluidization promoter comprises carbon in particle form.

Specifically Applicants have discovered that the promoters required to be added to achieve satisfactory fluidization do not act as replacements for a size range in the catalyst or other solids which make up the bed, i.e., adding an equal volume of a neat catalyst equal in size to a promoter selected in accordance with the present invention will not result in the same affect as is achieved by addition of the aforesaid promoter. An important advantage of this invention is that is permits a relatively large number of catalyst particles to be effectively introduced into a reaction using a relatively small amount of promoter. This allows the utilization of a greater proportion of the active catalyst for a given reactor volume and quality of fluidization. The enhancement in fluidization achieved by the invention may be determined by the standard technique of measuring pressure fluctuations across a fixed fluidized bed by means of a pressure transducer-recorder system. Pressure fluctuations are caused by large bubbles passing through the bed and breaking at the surface, and thus a decrease in pressure fluctuations indicates improved fluidization through the formation of smaller bubbles.

Applicants have discovered that in order to enhance and maintain fluidization of a fixed catalyst bed by adding a promoter to the bed it is necessary that the promoter be a particulate material which has a smaller average particle size and a lower apparent density than the catalyst. The size distribution of the promoter particles is critical; in general the promoter particles should have an average size in the order of about 75%, but preferably 25%, of the average size of the catalyst particles and preferably have a maximum size less than that of 80% of the catalyst. However, the actual size distribution which the promoter is required to have in order to enhance fluidization will vary with the size distribution of the catalyst. In general, the smaller the size of the catalyst particles, the smaller the size of the promoter particles.

By way of example, conventional iron oxide Fischer-Tropsch catalysts generally are used with a particle size distribution such that at least about 80% of the particles in the range of from about 10 to about 80 microns, with the maximum particle size not exceeding about 120 microns and the average particle size being between about 20 and about 50 microns. It has been determined that for such conventional Fischer-Tropsch catalysts the addition of carbon with an average particle size of about 10 microns, added in the relatively small amount of about 5 wt. % of the total bed, is most effective in achieving good fluidization. Preferably, the particle size of the carbon is predominantly (at least about 80% of the particles) in the range of between about 5 to about 10 microns. Of course, somewhat larger particle sizes and average particle sizes may be used with larger catalyst particles or where a smaller improvement in quality of fluidization is acceptable. In this connection it is to be appreciated that for the purposes of this invention it is preferred that in Fischer-Tropsch reactions the iron group catalysts, and especially alkali-promoted iron oxide catalysts, be used with a particle size not exceeding about 120 microns and with a particle size distribution such that at least about 80% of the particles have a particle size in the range of 20–80 microns.

The magnitude of the difference in apparent density which is required between the promoter and the catalyst particles in order to enhance fluidization tends to vary according to the degree of difficulty in fluidizing the neat catalyst, but the difference between the two must be large enough for the promoter per se to have a fluidization characteristic which is perceptibly different than that of the catalyst even where the two have a substantially identical apparent distribution. Typically the ratio of particle densities between promoter and catalyst should be about 0.6 or less. By way of example, iron oxide Fischer-Tropsch catalysts typically have apparent densities in the range of about 3–5.2 gm/cc, which means that the promoter preferably has an apparent density of about 1.5 gm/cc or less.

The amount of promoter admixed with the catalyst has an affect on the degree of enhancement of fluidization resulting from addition of the promoter. It has been determined that the minimum amount of a given promoter required to be used in order to achieve any substantial improvement in fluidization of a catalyst bed will vary with the nature of the catalyst and in particular the respective densities and size distributions of the catalyst and the promoter. Applicants also have discovered that the beneficial effect of the promoter on fluidization is not simply proportional to the amount of promoter added, but once a critical quantity of promoter (specific to the promoter and neat catalyst and more specifically their respective densities and size ranges) has been reached, addition of more promoter to the bed serves little practical purpose. For a given catalyst the minimum amount of promoter required to be added to enhance the quality of fluidization is approximately the same on a volume percent basis, regardless of the size distribution or density of the promoter as long as those are within the ranges indicated above, but will differ on a weight percent basis according to the size distribution and density of the promoter. Thus the minimum amount of a given promoter required to achieve good fluidization of a catalyst bed might be about 5 wt. % for one catalyst and about 30 wt. % for another catalyst.

If a promoter is added to a catalyst bed in accordance with the teachings of this invention, the mixing of promoter and catalyst will be rapid and complete and elutriation of the promoter is surprisingly low. The small amount of promoter which does elutriate and become entrained in the reactor effluent may be recovered by conventional means such as by passing the effluent through a cyclone separator which has a dipleg or catalyst return line leading into the catalyst bed. The improved fluidization achieved by addition of a promoter as herein prescribed is readily discerned by the absence of slugging and pressure fluctuations and improved conversion of reactants to desired products.

In the practice of this invention, improved quality of fluidization is achieved for a wide range of superficial gas velocities, ranging from a minimum bubbling velocity of approximately 2 cm/sec, to 60 cm/sec or higher. Little or no classification of the promoter and catalyst solids in the bed will occur so long as the fluid velocity through the reactor which houses the bed exceeds the greatest of the minimum bubbling velocities of the two particulate materials. A superficial gas velocity of about 20-50 cm/sec is suitable and preferred for most cases. For example, in the case of Fischer-Tropsch reactions in the presence of iron group catalysts, the preferred superficial gas velocity for a commercial reactor is approximately 45 cm/sec.

This invention may find acceptance in all fluidized solid systems employing a particulate matter which is not easily fluidized. In particular fixed fluidized bed reactor systems using heavy metal based catalysts may be improved by this invention. A specific example is the use of powdered carbon as a promoter for the fluidization of the alkali promoted iron catalyst used in the so-called Fischer-Tropsch reaction. In such case the powdered carbon used as promoter may be obtained from a variety of sources such as wood charcoal in finely powdered form, powdered activated carbon, and char (the carbon residue from coal gasification).

The following examples demonstrate how fluidization of a catalyst bed may be improved by this invention and also shows the effect of varying the average size and also the density and composition of the promoter material.

EXAMPLE I

This example comprises five runs showing how different promoters used in the same volume concentration have different effects on fluidization:

Run No. 1

A reactor containing a bed of a Fischer-Tropsch alkali-promoted iron catalyst was fluidized using nitrogen as the fluidizing medium. The catalyst comprises iron oxide, iron and iron carbide. The reactor had an overall length of 5 meters, an internal diameter of 14 cm., and a total bed length of 280 cm. The bed was fluidized at a gas superficial velocity of 50 cm/sec. The particle size of the catalyst was less than 10% greater than 60 micron and less than 20% smaller than 10 micron. The upper end of the fluidized bed to a depth of about 30 cm. from the top of the bed was studied for pressure fluctuations which were recorded by means of a pressure transducer recorder system.

Run No. 2

Run No. 1 was repeated without change except that the bed was modified by adding dolomite as a fluidization promoter to a volume concentration of 25% (its mass concentration was about 10.6%). The mean size of the dolomite particles was about 10 microns.

Runs No. 3, 4 and 5

Three additional runs were made exactly like Run No. 2 except that different promoters were used as follows: Run No. 3—25 volume % carbon (4.0% mass); Run No. 4—25 volume % alumina (6.2% mass); and Run No. 5—25 volume % silica (3.8% mass). These promoters all had a mean particle size of about 10 microns.

FIG. 1 illustrates pressure fluctuations across the bed for Runs No. 1-5. These runs show that addition of relatively small amounts of carbon, alumina or silica on a weight percent basis produces a marked improvement in the quality of fluidization, while a larger weight percent concentration of dolomite has little or no beneficial effect. It is to be appreciated that the catalyst in the tests had apparent density of about 5.2 gms/cc, and the dolomite had an apparent density of about 2.7 gms/cc, while the apparent densities of the carbon, alumina and silica were 0.8, 1.4 and 0.7 gm/cc respectively. The addition of promoters, whose apparent density is less than that of neat catalyst, does reduce the overall bed density and consequently gives a reduced pressure fluctuation for the same quality of fluidization. The effect of the reduced density on pressure fluctuations is, however, minimal and the observed improvements in the quality of fluidization are due to the inherent properties of the promoter and not to a mere lowering of bed density. In the Fischer-Tropsch reaction carbon is formed on the catalyst and consequently in a batch operation the catalyst density constantly decreases. However even when the bed density drops to a level equal to that of Runs 3, 4 and 5, the inventors have found that the improvement in quality of fluidization is very small when compared to that achieved by adding a fluidization promoter. Thus carbon formed on the catalyst during the Fischer-Tropsch reaction does not have the ability to improve the quality of fluidization to anything like the extent of added carbon powder.

EXAMPLE II

This example comprises five runs, Nos. 6-10, made with the same reactor and catalyst used in Example I and demonstrates the effect of varying the particle range of the fluidization promoter. All five were conducted like Run No. 1 (Example I) except that in Runs No. 7-10 the promoter consisted of alumina in a volume concentration of 25% (in Run No. 6, the catalyst bed consisted solely of the iron catalyst). The particle size of the promoter (and consequently its mass concentration) was varied as follows: Run No. 7—45 microns (8.7 wt. %); Run No. 8—30 microns (7.1 wt. %); Run No. 9—15 microns (7.1 wt. %); and Run No. 10—7 microns (6.2 wt. %).

Figure 2:
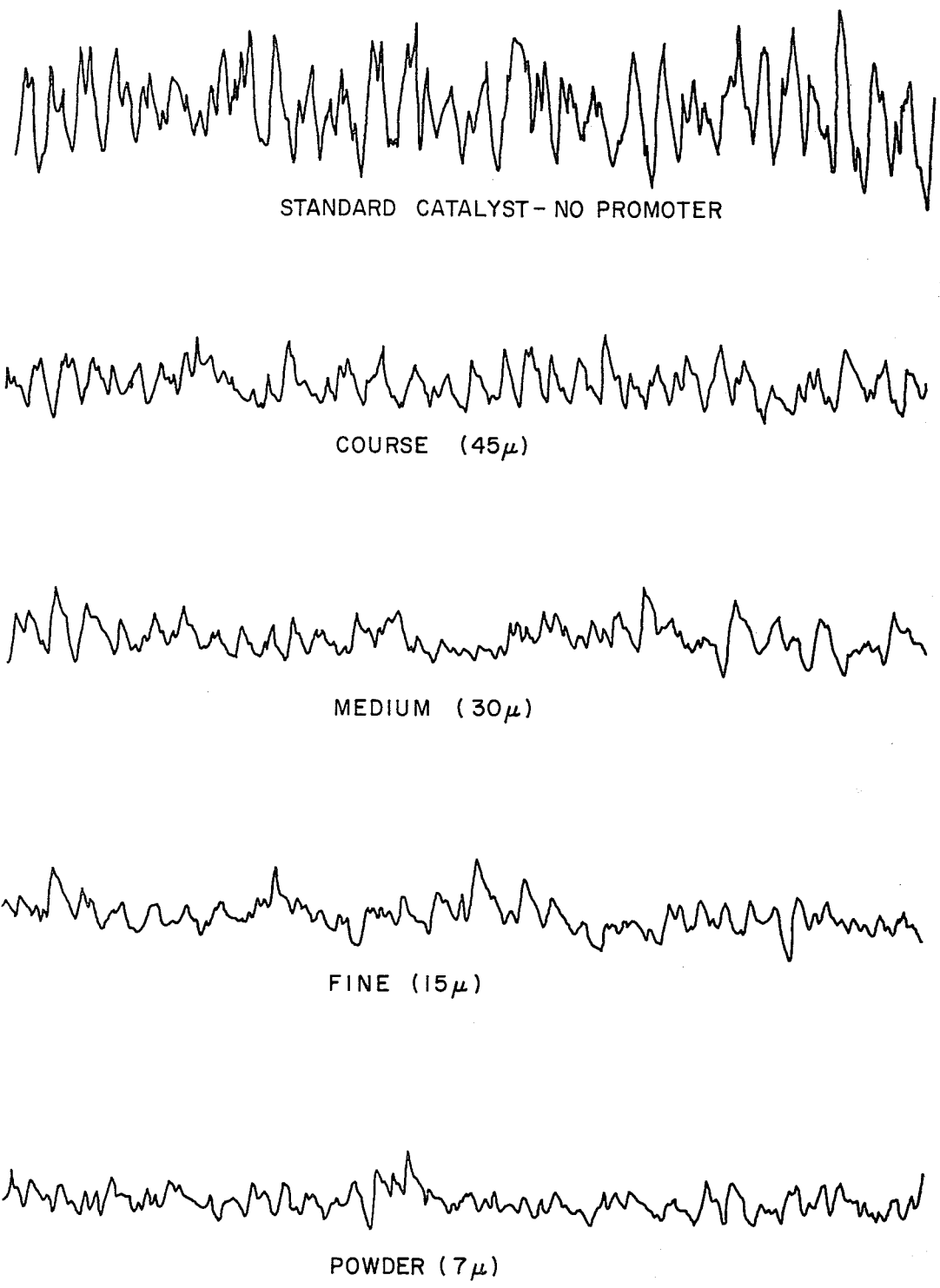
FIG. 2 is a series of waveforms like those of FIG. 1 and shows how varying the particle size of a given promoter has an effect on the quality of fluidization.

FIG. 2 illustrates the pressure fluctuations measured across the top of the bed. A comparison of the several waveforms of FIG. 2 reveals that a beneficial effect results from diminishing particle size and that alumina of 7 microns average size is a substantially better promoter than alumina of 30 or 45 microns size and at least somewhat better than alumina of 15 microns average size. Furthermore using a fine powdered promoter allows the same or a better quality fluidization to be acquired with a smaller wt. % of promoter, e.g., 6.2 % of 7 micron size alumina provides better fluidization than 8.7 wt. % of alumina of 45 micron size.

EXAMPLE III

This example comprises four runs, Nos. 11-14, made under the same conditions and with the same reactor and catalyst as in Example I and demonstrates the effect of varying the amount of carbon (in the form of activated carbon) used as a fluidization promoter. In Run No. 11, the catalyst bed consisted solely of the catalyst. In Runs Nos. 12-14, carbon was added to the catalyst bed and the concentration of the carbon as a percent of the total amount of catalyst and promoter making up the bed was varied as follows: Run No. 12—5 volume percent (0.9 wt. percent); Run No. 13—15 volume percent (3.0 wt. percent); and Run No. 14—25 volume percent (5.5 wt. percent). The particle size distribution of the carbon was as follows in each of Runs Nos. 12-14: 33% less than 5 microns, 46% between 5 and 10 micron, 21% greater than 10 micron.

Figure 3:
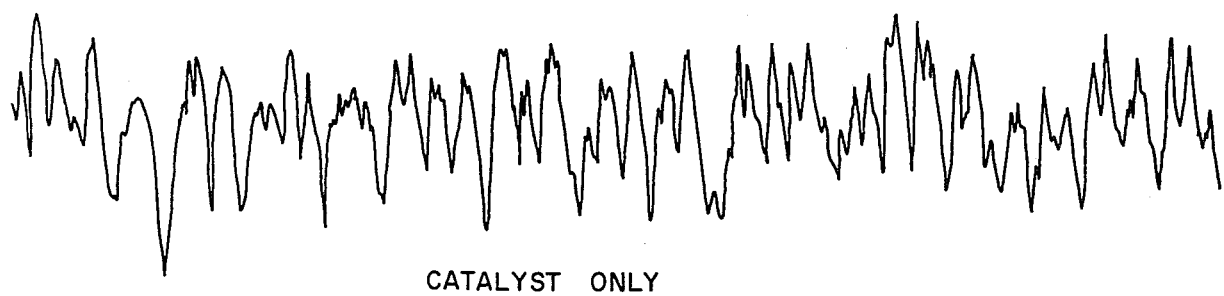
FIG. 3 is a series of waveforms like those of FIG. 1 and shows how varying the concentration of particulate carbon in an iron-group Fisher-Tropsch catalyst bed has an effect on catalyst fluidization.
Figure 3:
Figure 3:
Figure 3:

FIG. 3 illustrates the pressure fluctuations across the bed for Runs No. 11-14. The results represented in FIG. 3 show that (1) substantial improvement in the quality of fluidization can be obtained by adding carbon powder to the catalyst bed in amounts as little as 0.9 to 3.0 wt. percent and (2) addition of about 5.5 wt. % of carbon powder having an average particle size of about 10 micron produces a surprisingly great improvement in the quality of fluidization. Of course, carbon may be added to the bed in amounts greater than 5.5 wt. %. However, the beneficial effect of the carbon on fluidization is not simply proportional to the amount added, and once a minimum amount of carbon has been added, addition of more carbon appears to serve little practical purpose. Presently it appears that increasing the amount of carbon from about 5.5 to about 8 wt. % has a beneficial effect on fluidization, but the improvement is less proportionately than, for example, increasing the amount from a level of about 3.0 to about 5.5 wt. %. Increasing the carbon concentration in the bed to above about 8 wt. % is not practical since the added benefit obtain is negligible and not justified economically. For most cases, it appears necessary for the bed to comprise at least about 1.0 wt. % carbon in order for its fluidization to be enhanced enough to justify the addition of the promoter.

EXAMPLE IV

This example comprises eight runs (Nos. 15-22) and illustrates the relative chemical inertness of various possible fluidization promoters to the Fischer-Tropsch reaction. Each run was a Fischer-Tropsch synthesis carried out in a high pressure pilot reactor of 5 cm. internal diameter. This type of reactor was selected since it is known that it tends to provide high conversions despite substantial variations in fluidization quality; hence quality of fluidization is not a significant parameter in the runs made in this particular reactor. Except for Run No. 16, in each run the reactor contained an alkali-promoted Fischer-Tropsch catalyst. In Run No. 16, the catalyst was the same except that it contained no alkali promoter. In each run the bed was fluidized at a gas superficial velocity of approximately 45 cm/sec, the reactor temperature and pressure were about 330° C. and about 20 bar, and the catalyst volume prior to fluidization was about 2 liters. The reactants were $H_2$ and CO and $CO_2$ and the reactant gas was used to fluidize the catalyst. Table I lists the fluidization agents used and the synthesis results and percent methane ($CH_4$) selectivity for each agent. The term "F.C.C." designates a standard silica/alumina catalyst for a fluid catalytic cracking process. The synthesis results are listed on the basis of water and oil drainings per day and the percent of CO and $CO_2$ converted.

TABLE I

| Run No. | Fluidization Promoter Added | Synthesis Results (kg/day) water | oil | %CO & $CO_2$ converted | % $CH_4$ Selectivity |
|---|---|---|---|---|---|
| 15 | None | 47 | 18.8 | 87 | 11 |
| 16 | None | 28 | 1.5 | 79 | 37 |
| 17 | F.C.C. | 22 | 0.4 | 68 | 48 |
| 18 | F.C.C. | 24 | 1.4 | 69 | 41 |
| 19 | Alulmina | 44 | 11.0 | 83 | 23 |
| 20 | $SiO_2/Al_2O_3$ | 35 | 2.8 | 85 | 35 |
| 21 | Coal fly ash | 42 | 10.8 | 81 | 20 |
| 22 | Activated carbon | 49 | 18.1 | 89 | 11 |

The results of Table I show that within experimental limits activated carbon has a negligible adverse effect on the Fischer-Tropsch reaction carried out with an alkali promoted iron catalyst. However, the other added materials all have adverse effects giving rise to a low oil draining and a high methane selectivity; in this respect these other materials cause the catalyst to perform as though it were chemically unpromoted.

Table II summarizes the results of two additional Runs Nos. 23 and 24 which were similar to Runs Nos. 15 and 22 respectively except that wood charcoal was used, in place of the activated carbon and the amount of catalyst was different. In Run No. 23, the charge of catalyst was 6 kg. In Run No. 24, the bed consisted of 4.75 kg. catalyst and 156 g. charcoal. These results show that wood charcoal has no adverse effects on the oil producing Fischer-Tropsch reaction.

TABLE II

| Run No. | Fluidization Promoter Added | Days On Line | Synthesis Results Drainings Kg/day water | oil | % CO & $CO_2$ Converted | $CH_4$ Selectivity |
|---|---|---|---|---|---|---|
| 23 | None | 2-4 | 47 | 15.6 | 91 | 14 |
|  |  | 5-7 | 45 | 14.4 | 91 | 13 |
|  |  | 8-11 | 46 | 14.2 | 92 | 13 |
|  |  | 12-14 | 47 | 14.1 | 92 | 13 |
| 24 | Wood Charcoal | 2-4 | 46 | 15.9 | 91 | 14 |
|  |  | 5-7 | 47 | 14.6 | 92 | 15 |

TABLE II-continued

| Run No. | Fluidization Promoter Added | Days On Line | Synthesis Results Drainings Kg/day | | % CO & CO$_2$ Converted | CH$_4$ Selectivity |
|---|---|---|---|---|---|---|
| | | | water | oil | | |
| | | 8–11 | 47 | 14.5 | 92 | 13 |
| | | 12–14 | 48 | 14.8 | 93 | 12 |

The chemical inertness of activated carbon and wood charcoal, when combined with the enhancement of quality of fluidization, makes possible a great improvement in performance in a large diameter fixed bed synthesis unit where the quality of fluidization is an important parameter.

It is to be appreciated that this invention is not limited in its application to Fischer-Tropsch alkali-promoted iron catalyst as set forth in the preceding examples and may be used instead to facilitate fluidization of other heavy catalysts which are difficult to fluidize. Of course, the choice of fluidization promoter also must take into consideration the requirement that the promoter be inert with respect to the solids being fluidized. Hence, for example, carbon is most suitable for use as a fluidization promoter for a Fischer-Tropsch alkali-promoted iron catalyst where a high oil production and selectivity is required. On the other hand, sand and silica gel are unsuitable for the same purpose since they tend to deactivate the iron catalyst or otherwise reduce selectively. However, it is recognized that sand, silica gel and alumina may be used as fluidization promoters in catalytic fluid bed reaction systems where they are chemically inert or substantially so. If the desired products in the Fischer-Tropsch reaction are light hydrocarbons, such as methane, rather than oil, then silica and alumina will be acceptable as fluidization promoters. Besides improving the quality of fluidization they may also improve the selectivity of the desired, in this case, low molecular weight, hydrocarbons. It is to be appreciated also that this invention is not limited in its application to Fischer-Tropsch reactions or to reaction systems employing iron catalyst. Thus, by way of example and not limitation, carbon may be used to fluidize iron catalysts used in dehydrogenation reaction systems (see, for example, U.S. Pat. No. 3,502,737, issued Mar. 24, 1970 to J. R. Gublikian), and catalysts containing cobalt, nickel, lead, palladium, etc. Likewise, other fluidization promoters may be provided in accordance with the teachings of this invention for hydrocarbon synthesis reactions using catalysts of cobalt or nickel or other materials (see U.S. Pat. No. 2,471,913 issued to S. D. Summerford, U.S. Pat. No. 2,360,787 issued to E. V. Murphree et al, U.S. Pat. No. 2,398,462 issued Apr. 16, 1946 to O. Roelen et al, and U.S. Pat. No. 2,553,398 issued May 15, 1951 to H. V. Atwell). A further possible application is the oxidation/reduction of particulate iron ore in a fluidized bed, i.e., the steam-iron-hydrogen process. The invention also may be used to fluidize solids in catalyst regeneration zones or reactors. Still other applications of the teachings of the invention to improve catalyst bed fluidization will be apparent to one skilled in the art. In each case the density and size distribution of the promoter are selected in accordance with the corresponding qualities of the neat catalyst, while the quantity of promoter and the choice of promoter composition is made to satisfy the requirement that it be inert with respect to the reaction. It is to be appreciated also that the invention also may be used to promote fluidization of beds of non-catalytic solids, e.g., a bed of fluidized solids used as heat carriers to promote heat distribution throughout a reaction zone (see U.S. Pat. No. 2,393,636 issued Jan. 29, 1946 to E. A. Johnson, U.S. Pat. No. 2,287,891 issued June 30, 1949 to E. Linckh, and U.S. Pat. No. 2,483,485 issued Oct. 4, 1949 to F. T. Barr). While the invention is obviously directed to fluidized masses which are commonly described as dense phase suspensions, it also is applicable to systems which comprise a dilute phase suspension. The invention also is applicable to catalyst regenerating systems where catalyst is regenerated while maintained as a fluidized mass in a zone or reactor separate from the zone or reactor in which the catalyst is used to catalyze a selected chemical reaction. In each case the essential thing is that the promoter be inert (i.e. have no deleterious effect) with respect to the specific reaction system, and also be a material of different composition and smaller density and also a smaller particle size than the solids to be promoted.

As used herein, the term "iron-based" as applied to a catalyst or other composition means a material which is predominately iron or an iron compound such as iron oxide or iron carbide, while the term "iron group" denotes (1) those metals which are included in Group VIII of the Periodic Table, specifically iron, nickel, cobalt, iridium, rhodium, ruthenium, osmium, palladium and platinum, and (2) compounds of such metals. It is to be understood also that, unless specifically indicated otherwise, the term "catalyst" is to be construed as consisting of a catalyst alone (whether chemically promoted or not) or of a catalyst plus some other material which forms an integral mass with the catalyst, e.g., an inert catalyst support. The term "carbon" as used herein means powdered carbon from a variety of sources. For example, the carbon may comprise wood charcoal in finely divided form, powdered activated carbon, or char, the carbon residue from coal gasification.

What is claimed is:

1. In a process where solid particles of a selected catalyst material are maintained as a fluidized bed in a reactor and used to catalyze a selected chemical reaction whereby at least one predetermined gaseous organic compound is produced in said reactor from one or more reactants supplied to said reactor in gaseous form, the method of improving the quality of fluidization which comprises admixing and fluidizing with said particles a solid fluidization promoter of lower apparent density and smaller average particle size than said particles so that said promoter particles remain in and form a part of said stationary fluidized bed and said mass is free of stratification, said promoter being a selected material which (a) is not one of said reactants and is substantially inert with respect to said reaction and (b) does not reduce the activity of the catalyst, the ratio of the apparent density of the promoter to the apparent density of the catalyst material not exceeding about 0.6, and said promoter being present in an amount sufficient to reduce pressure fluctuations across the fluidized bed.

2. The process of claim 1 wherein the selected catalyst material comprises an iron group catalyst and has a density in the range of about 3–5.2 gm/cc, and the promoter has a density not exceeding about 1.5 gm/cc.

3. The process of claim 1 in which the selected catalyst material is fluidized by a gas stream having a velocity at least equal to the greater of the minimum bubbling velocities for (a) the selected catalyst material and (b) the promoter.

4. The process of claim 1 where the promoter is a material from the group consisting of carbon, alumina, and silica.

5. The process of claim 2 in which the selected chemical reaction is a Fischer-Tropsch reaction involving hydrogen and carbon monoxide as reactants.

6. The process of claim 2 in which the gas stream velocity is between about 2 cm/sec. and about 60 cm/sec.

7. A catalyst composition comprising solid particles of a catalyst having a first known composition characterized by the presence of a fluidization promoter which consists of solid particles of a second different composition and is substantially chemically inert with respect to said catalyst, said promoter having a lower apparent density and a smaller average particle size than the particles of said first composition, the particles of said promoter being admixed with said particles of first known composition and the ratio between the apparent particle density of the promoter and the apparent particle density of the catalyst does not exceed about 0.6, said promoter being present in an amount which is sufficient for it to have the effect of reducing pressure fluctuations across a fluidizable bed of the said catalyst composition, and said promoter having a maximum size less than that of 80 percent of the catalyst particles and an average size not exceeding about 75% of the average size of the catalyst particles.

8. A process for synthesizing an organic compound according to a Fischer-Tropsch synthesis reaction comprising:
disposing in a reactor a mixture of an iron group Fischer-Tropsch catalyst in particle form and a fluidization promoter in particle form having a lower density and smaller average particle size than the particles of said catalyst, introducing hydrogen and carbon monoxide as reactants into said reactor and fluidizing said catalyst and promoter so as to maintain them as a fixed fluidized bed with said reactants in contact with said catalyst, maintaining said reactor at a temperature at which said reactants will react and produce at least one selected hydrocarbon product, and recovering reaction products and unreacted reactants from said reactor.

9. A process according to claim 8 wherein said promoter is a material which is substantially inert with respect to said catalyst and said synthesis reaction.

10. A process according to claim 8 wherein said fluidization promoter is carbon.

11. A process according to claim 10 wherein at least about 80% of the particles of said carbon fluidization promoter have a particle size of between about 5 to about 10 microns and at least about 80% of the particles of said catalyst have a particle size in the range of about 10 to about 80 microns.

12. A process according to claim 10 wherein the average particle size of said promoter is about 25% of the average particle size of the catalyst.

13. A process according to claim 10 wherein said catalyst particles have an average particle size of between about 20 and 50 microns.

14. A process according to claim 10 wherein said bed consists of between about 1 and about 8 weight percent carbon particles.

15. A process according to claim 11 wherein said catalyst particles have a particle size not exceeding about 120 microns.

16. A process according to claim 11 wherein the average particle size of said carbon fluidization promoter does not exceed about 75% of the average particle size of said catalyst.

17. In a process where solid particles of a selected Fischer-Tropsch catalyst essentially comprising an iron group material are maintained as a fluidized bed in a reactor and used to catalyze a Fischer-Tropsch gas phase reaction involving hydrogen and carbon monoxide gases as reactants whereby at least one predetermined organic compound is produced in said reactor, the method of improving the quality of fluidization which comprises admixing and fluidizing with said particles of catalyst a solid fluidization promoter comprising carbon particles having an average particle size of 5-10 microns which is smaller than the average particle size of the catalyst particles so that substantially all of said carbon particles remain in and form a part of said fluidized bed and do not form a separate strata in said fluidized bed, the ratio of the apparent density of said carbon particles to the apparent density of the catalyst particles not exceeding about 0.6 and said carbon particles being present in an amount sufficient to cause pressure fluctuations across the fluidized bed to be lower than when the fluidized bed is free of said carbon particles.

18. The process of claim 17 in which the fluidization promoter has an average particle size not exceeding about 75% of the average particle size of the selected catalyst material.

19. In a process where solid particles of a selected iron group Fischer-Tropsch catalyst material are maintained as a fluidized bed in a reactor and used to catalyze a selected chemical reaction whereby at least one predetermined organic compound is produced in said reactor from one or more reactants, the method of improving the quality of fluidization which comprises admixing with said particles prior to fluidization thereof a solid fluidization promoter consisting of carbon particles so that on fluidization said promoter particles are fluidized and remain in and form a part of said fluidized bed, said iron group material having an apparent density in the range of about 3 to about 5.2 gm/cc and said carbon particles having an apparent density not exceeding about 1.5 gm/cc, said iron group material also having a particle size not exceeding about 80 microns and said carbon particles having an average particle size not exceeding about 75% of the average particle size of said iron group material.

20. The process of claim 19 wherein said carbon particles have a particle size of between about 5 and 10 microns.

21. In a process where solid particles of alkali-promoted Fischer-Tropsch catalyst comprising an iron group material are maintained as a fluidized bed in a reactor and used to catalyze a selected gas phase chemical reaction whereby at least one predetermined organic compound is produced in said reactor from one or more gaseous reactants, the method of improving the quality of fluidization which comprises admixing and fluidizing with said particles a solid fluidization promoter of lower apparent density and smaller average particle size than said particles so that said promoter particles are fluidized and remain in and form a part of said fluidized bed, said promoter being a selected material which (a) is substantially inert with respect to said reaction and (b) does not reduce the activity of the catalyst, the ratio of the apparent density of the promoter to the apparent density of the catalyst not exceeding about 0.6, and said promoter being present in an amount sufficient to reduce pressure fluctuations across the fluidized bed.

22. A catalyst composition comprising solid particles of an iron group catalyst for carrying out a Fischer-Tropsch synthesis reaction characterized by the presence of a fluidization promoter which consists of solid particles of carbon and is substantially chemically inert with respect to said catalyst, said carbon promoter having a lower apparent density and a smaller average particle size than the particles of said iron group catalyst, the particles of said carbon promoter being admixed with said particles of iron group catalyst composition so that said catalyst composition comprises between about 1 and about 8 weight percent carbon promoter and the ratio between the particle density of the carbon promoter and the particle density of the iron group catalyst does not exceed about 0.6, said promoter and catalyst particles being fluidizable by at least one gas from the class consisting of hydrogen and carbon monoxide so that substantially all of said promoter particles remain in admixture with said catalyst particles, said gas having a velocity through the bed at least equal to the greater of the minimum bubbling velocities for (a) the catalyst and (b) the carbon promoter.

23. A catalyst composition according to claim 22 wherein said iron group catalyst has an apparent density in the range of between about 3 and about 5.2 gm/cc and a particle size not exceeding about 80 microns, and said carbon particles have an apparent density not exceeding about 1.5 gm/cc and an average particle size not exceeding about 75% of the average particle size of said iron group catalyst.

24. In a process where solid particles of a selected Fischer-Tropsch catalyst comprising an iron group material are contacted by hydrogen and carbon monoxide gases flowing at a superficial gas velocity of 20–50 cm/sec. and maintained as a fluidized bed in a reactor and used to catalyze a selected vapor phase chemical reaction whereby at least one predetermined organic compound is produced in said reactor by reaction of said hydrogen with said carbon monoxide, the method of improving the quality of fluidization which comprises admixing and fluidizing with said particles a solid fluidization promoter of lower apparent density and smaller average particle size than said particles so that said promoter particles form a part of said fluidized bed and said bed is free of classification of said catalyst and promoter, said catalyst having an apparent density in the range of about 3–5.2 gm/cc, a particle size not exceeding about 120 microns and an average particle size between about 20 and about 50 microns, said promoter being carbon and having a smaller average particle size than said catalyst with at least about 80% of the promoter particles being between about 5 and about 10 microns, said promoter being present in an amount which is sufficient to reduce pressure fluctuations across said bed.

* * * * *

UNITED STATES PATENT AND TRADEMARK OFFICE
CERTIFICATE OF CORRECTION

PATENT NO. : 4,225,531
DATED : September 30, 1980
INVENTOR(S) : David H. Jones et al It is certified that error appears in the above—identified patent and that said Letters Patent is hereby corrected as shown below:

Column 10, line 53, cancel "stationary".
Column 10, line 53 "mass" should read -- bed --.
Column 11, line 27, "fluidizable" should read
-- fluidized --.

Signed and Sealed this

Twenty-fifth Day of May 1982

[SEAL]

Attest:

Attesting Officer

GERALD J. MOSSINGHOFF

Commissioner of Patents and Trademarks